(No Model.)
F. SCHEFOLD & G. F. PENN.
SPINDLE OF GLASS POLISHERS.
No. 414,258. Patented Nov. 5, 1889.
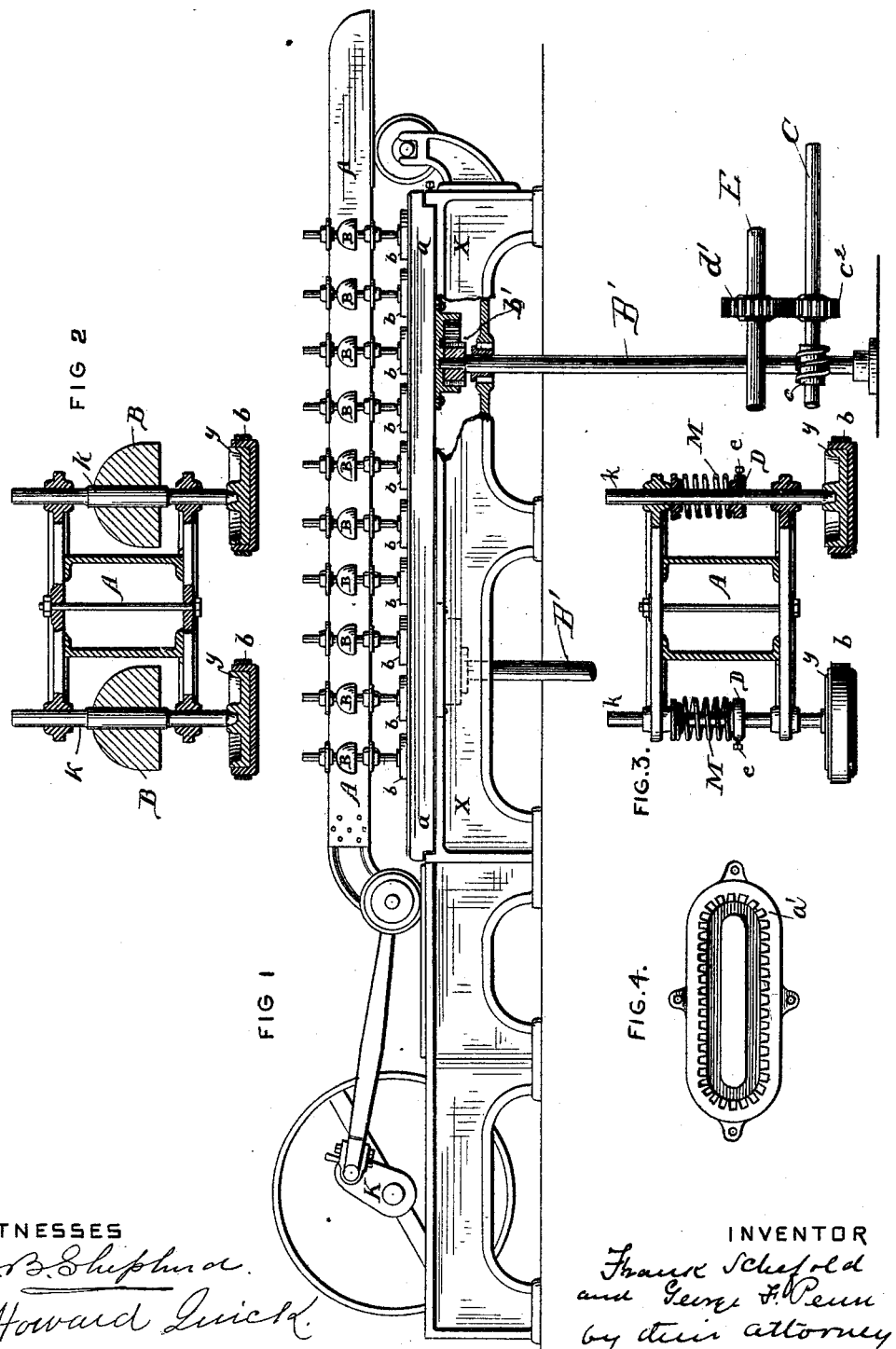
WITNESSES
INVENTOR
Frank Schefold
and George F. Penn
by their attorney

UNITED STATES PATENT OFFICE.

FRANK SCHEFOLD AND GEORGE F. PENN, OF NEW ALBANY, INDIANA, ASSIGNORS TO N. T. DE PAUW, OF SAME PLACE.

SPINDLE OF GLASS-POLISHERS.

SPECIFICATION forming part of Letters Patent No. 414,258, dated November 5, 1889.

Application filed December 27, 1887. Serial No. 258,995. (No model.)

*To all whom it may concern:*

Be it known that we, FRANK SCHEFOLD and GEORGE F. PENN, of New Albany, county of Floyd, and State of Indiana, have invented a new and useful Improvement in the Spindles of Glass-Polishers, of which the following is a true and exact description, due reference being had to the drawings which accompany and form part of this specification.

Our invention relates specifically to that class of glass-polishing machines wherein the plate to be polished is supported upon a suitable horizontal bed-plate or table, to which a reciprocating motion in a right line is imparted by appropriate mechanism, while at the same time a series of polishing-blocks arranged in a frame-work are reciprocated over the upper surface of the glass plate, the said framework moving in a path transverse to that of the plate itself.

In the drawings, Figure 1 represents a side view of the plate-glass polishers with the spindles as they are now ordinarily constructed. Fig. 2 represents a vertical section of two spindles with method of connection with the beam, the spindles in this view being constructed in the manner now ordinarily used. Fig. 3 represents a vertical section of two spindles constructed in accordance with our invention. Fig. 4 is a bottom plan of one of the racks secured to the under side of the table, by means of which the latter is reciprocated by the rotation of the vertical shaft.

In the drawings similar letters denote similar parts.

X X X, Fig. 1, is a frame secured to a solid foundation. On top of this frame X X X is a movable table $a\ a$. The table $a\ a$, by means of the mechanism now in use, is given a movement backward and forward across the top of the frame X X X, and the glass to be operated upon is laid or bedded in plaster-of-paris upon the surface of this table. Any suitable mechanism for giving this movement to the table may be used, the particular mechanism forming no part of our present invention. That shown in the drawings is substantially as follows: To the under side of the table are secured the curved rack-plates $a'$. With the gear-racks of these plates mesh the pinions $b'$ on the upper ends of the vertical shafts $B'$, the extreme end of each shaft traveling in a race in the plate. These shafts are driven by worms $c$ on the horizontal shaft C, which in turn is driven by gears $c^2\ d'$ from the shaft $e$. The revolution of the vertical shafts causes the pinions $b'$ to travel around the racks $a'$, and, the shafts being mounted in fixed bearings in the frame, the table is automatically reciprocated in a positive and easy manner, as is well understood.

The beam A A has saddles or slabs of steel or iron at equal distances across the top of said beam, (the saddles or slabs being shown in Figs. 2 and 3,) and the upright spindles $k\ k$ are fastened to these saddles. These spindles $k\ k$ are fitted at the bottom with felt blocks $b\ b$.

In Figs. 1 and 2 are shown iron weights B B in the center of the spindles $k\ k$, which is the means now generally used to produce the desired pressure upon the glass to be operated upon.

In Fig. 3 is shown our improvement for obtaining the desired pressure upon the glass to be operated upon.

The beam A is caused to travel across the table by a large wheel which revolves the crank K. When in operation, at each revolution of the large driving-wheel, the beams A A are moved back and forth across the surface of the glass, and the felt blocks rest upon the glass, and at the same time the table is caused to move backward and forward, and a diagonal motion is given to the glass and the blocks in relation with each other, which produces the friction to polish the glass.

As before mentioned, our invention consists in an improved mechanism to produce the desired pressure upon the glass, and, as heretofore described and illustrated, in polishing-machines prior to our invention this was obtained by the weights B B. Our invention consists in accomplishing this by substituting springs for the weights B B, as illustrated in Fig. 3. A movable collar D is placed upon the spindles $k\ k$ and held in place by the set-screw $e\ e$. This collar can be lowered or raised so that it will be set at any desired position upon the spindles $k\ k$. A spring M is confined between the saddle (hereinbefore mentioned) and the collar D, and the collar can be so adjusted on the spindle as to produce a light or heavy pressure upon the blocks. In the drawings a spiral spring is shown; but a solid-rubber or any other character of spring may be used, as this invention is in no way limited by the character of the spring.

In practice the advantages derived from our improved means for obtaining the desired pressure are many. The weights now used necessitate an increased amount of power to move the spindles backward and forward over that necessary to perform the same work when the weights are replaced by springs, as in our improvement. In our improvement, by means of the set-screw and movable collar and spring, if the glass is short finish in one or more places, the pressure at these points may be adjustably increased so as to bring the whole surface of glass up at one continuous operation. The glass can be polished with greater rapidity on account of the dead-weight of the weights B B being removed. The friction which now occurs upon the beams on account of the violent motion is removed and a large saving is made in repairs and renewals. The spindles with our improvement can be used as they are cast without fittings or turnings so as to perfectly true them, as is now necessary.

Prior to our invention, on account of the weights in use, the spindles cut through the blocks $y\ y$ where the spindles enter, destroying the glass beneath and necessitating a new iron block, and by our improvement this is avoided.

Having now fully described our invention, what we claim, and desire to protect by Letters Patent, is—

In a glass-polisher, the combination, with the automatically-reciprocating horizontal bed-plate or table, forming a support for the glass, of a superjacent frame-work reciprocating in a path transverse to that of the table, said frame-work being provided with free rotary spring-seated polishers separately having an adjustable spring-tension, substantially as described.

FRANK SCHEFOLD.
GEO. F. PENN.

Witnesses:
JNO. W. LICH,
W. L. TOWN.